(12) United States Patent
Nagaike

(10) Patent No.: US 9,363,443 B2
(45) Date of Patent: Jun. 7, 2016

(54) PROCESSING CONTROL APPARATUS, PROCESSING CONTROL METHOD AND NON-TRANSITORY COMPUTER-READABLE STORAGE MEDIUM

(71) Applicant: CANON KABUSHIKI KAISHA, Tokyo (JP)

(72) Inventor: Ryuuji Nagaike, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 13/911,460

(22) Filed: Jun. 6, 2013

(65) Prior Publication Data

US 2014/0002686 A1 Jan. 2, 2014

(30) Foreign Application Priority Data

Jun. 28, 2012 (JP) ................ 2012-146085

(51) Int. Cl.
*H04N 5/228* (2006.01)
*H04N 5/225* (2006.01)
*H04N 5/232* (2006.01)
*H04N 5/235* (2006.01)
*H04N 5/272* (2006.01)

(52) U.S. Cl.
CPC ............... *H04N 5/235* (2013.01); *H04N 5/272* (2013.01)

(58) Field of Classification Search
CPC ............................. H04N 5/235; H04N 5/272

USPC .......... 348/169, 207.99, 211.9, 221.1, 222.1, 348/296
See application file for complete search history.

(56) References Cited

U.S. PATENT DOCUMENTS

| 8,223,214 B2 | 7/2012 | Toguchi | |
|---|---|---|---|
| 2008/0036877 A1* | 2/2008 | Arima | H04N 7/18 348/231.8 |
| 2009/0244327 A1* | 10/2009 | Toguchi | 348/239 |

FOREIGN PATENT DOCUMENTS

| JP | 2004-146890 A | 5/2004 |
|---|---|---|
| JP | 2008-042729 A | 2/2008 |
| JP | 2009-239499 A | 10/2009 |

\* cited by examiner

*Primary Examiner* — Trung Diep
(74) *Attorney, Agent, or Firm* — Fitzpatrick, Cella, Harper & Scinto

(57) ABSTRACT

A processing control apparatus controls mask processing for an image sensed by an image sensing unit with a variable image sensing position. A storage unit stores a mask setting. A control unit controls the image sensing unit. An obtaining unit obtains, from the control unit, exposure time information representing a progression of exposure by the image sensing unit, and obtains an image sensing position of the image sensing unit. A determination unit determines whether the exposure time information reaches a predetermined value, and determines a position on the image to which the mask processing is performed, based on (i) the image sensing position of the image sensing unit obtained by the obtaining unit and (ii) the mask setting, when the exposure time information reaches the predetermined value.

12 Claims, 5 Drawing Sheets

FIG. 5

| SAMPLING TIME | $z^0$ | $z^{-1}$ | $z^{-2}$ | $z^{-3}$ | $z^{-4}$ | $z^{-5}$ |
|---|---|---|---|---|---|---|
| ANGLE OF VIEW | | | | | | |
| ENLARGEMENT RATIO | | | | | | |
| ACCUMULATED FRAME REMAINING COUNT | | | | | | |
| PAN POSITION | | | | | | |
| TILT POSITION | | | | | | |
| ROTATION POSITION | | | | | | |

PROCESSING CONTROL APPARATUS, PROCESSING CONTROL METHOD AND NON-TRANSITORY COMPUTER-READABLE STORAGE MEDIUM

CLAIM OF PRIORITY

This application claims the benefit of Japanese Patent Application No. 2012-146085, filed on Jun. 28, 2012, which is hereby incorporated by reference herein in its entirety.

BACKGROUND OF THE INVENTION

1. Field of the Invention

The present invention relates to a processing control apparatus, a processing control method, and a non-transitory computer-readable storage medium, which control mask processing for an image sensed by an image sensing unit with a variable image sensing position.

2. Description of the Related Art

An image sensing apparatus, such as a monitoring camera that monitors, for example, a street, which, often, has a privacy masking function of superposing a privacy mask on a sensed image to protect privacy. In a camera equipped with a pan head, a tracking function of drawing a privacy mask at a position to be masked is required in accordance with the image sensing position. At this time, when the camera is configured to drive the pan head during image sensing using a slow shutter at, for example, night, it may become impossible to protect privacy, as only the superposition position of the privacy mask is updated to move, even during the period in which light is accumulated and the image is not updated over a plurality of frames.

To solve this problem, Japanese Patent Laid-Open No. 2004-146890 discloses a technique of generating a correction mask from data obtained by calculating the mask position for the current pan head position from mask setting coordinates stored in a mask setting, and that are obtained by calculating the mask position for the previous pan head position, and adding the correction mask in the direction in which the mask progresses.

Also, U.S. Patent Application Publication No. 2008/0036877 discloses a technique of, in loading an image including coordinates in a mask setting, superposing a mask on a region including a pan head position, at which loading is done at the current timing of an object, and that at which loading is done at the previous timing of the object.

However, the techniques described in Japanese Patent Laid-Open No. 2004-146890 and U.S. Patent Application Publication No. 2008/0036877 pose a problem that the privacy mask shifts from the start to stoppage of movement of the pan head if image sensing processing and mask superposition processing have a time difference between them.

SUMMARY OF THE INVENTION

In view of the above-mentioned problem, the present invention provides a technique of appropriately controlling mask processing, despite a time difference between image sensing processing and mask processing.

According to one aspect, the present invention provides a processing control apparatus that controls mask processing for an image sensed by an image sensing unit with a variable image sensing position, the apparatus comprising a storage unit configured to store mask setting, and a determination unit configured to determine a position on the image, to undergo the mask processing, based on an exposure time of the image sensing unit, an image sensing position of the image sensing unit, and the mask setting.

Further features of the present invention will become apparent from the following description of exemplary embodiments with reference to the attached drawings.

BRIEF DESCRIPTION OF THE DRAWINGS

FIG. 5 is a view illustrating an example of sampling information of another image sensing information sampling circuit according to the embodiment.

DESCRIPTION OF THE EMBODIMENTS

An exemplary embodiment(s) of the present invention will now be described in detail with reference to the drawings. It should be noted that the relative arrangement of the components, the numerical expressions, and the numerical values set forth in these embodiments do not limit the scope of the present invention, unless it is specifically stated otherwise.

Figure 1:
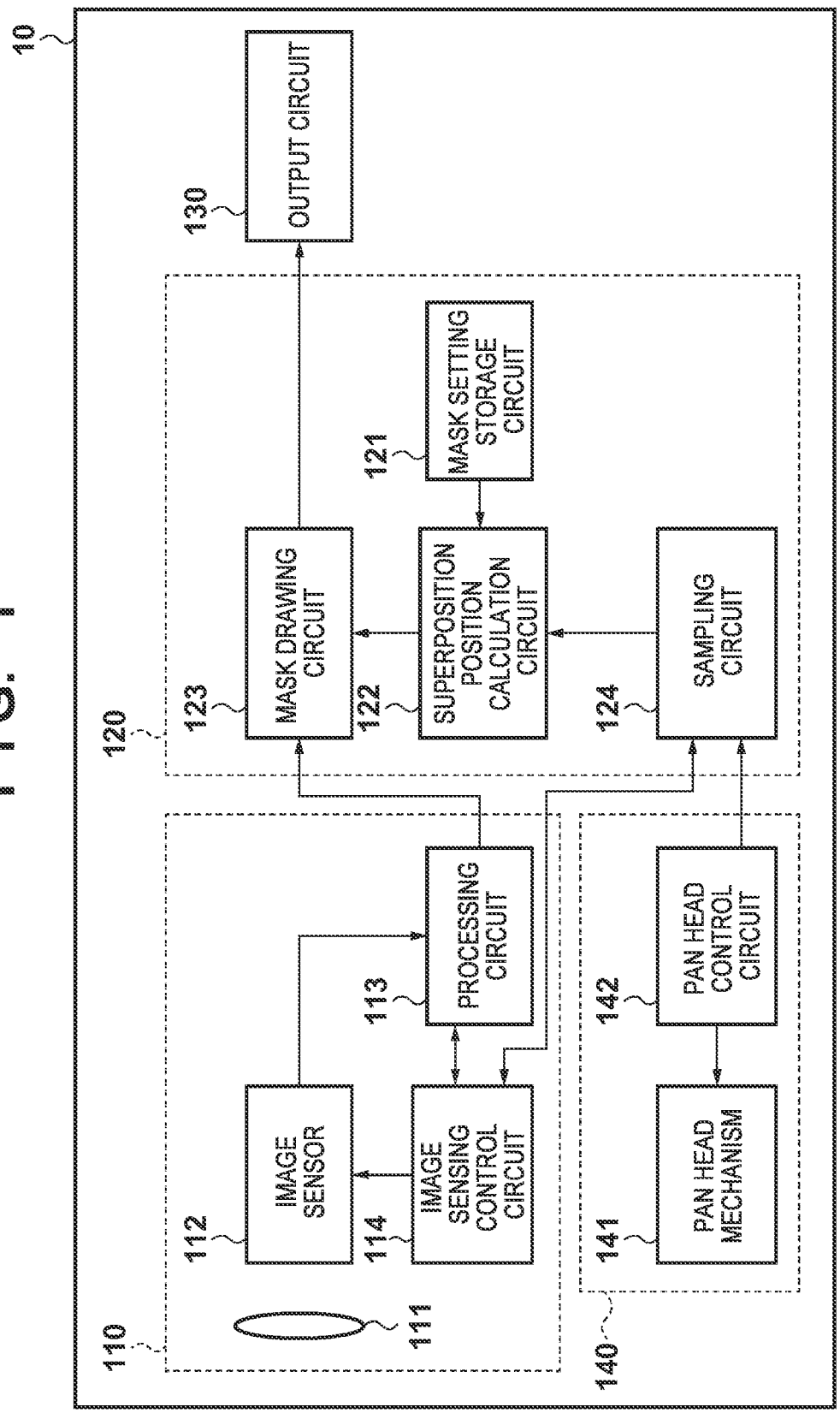
FIG. 1 is a block diagram illustrating an example of the configuration of an image sensing apparatus according to an embodiment.

An example of the configuration of an image sensing apparatus 10 according to the first embodiment will be described first with reference to FIG. 1. The image sensing apparatus 10 serves as, for example, a network camera connected to a network (not shown). The image sensing apparatus 10 includes an image sensing unit 110, a mask superposing unit 120, an output circuit 130, and a pan head unit 140. An image sensed by the image sensing unit 110 is output to the outside from the output circuit 130 via the mask superposing unit 120. The output circuit 130 outputs an image to, for example, a receiving apparatus (not shown) via a network (not shown).

The image sensing unit 110 includes an optical lens 111, an image sensor 112, a processing circuit 113, and an image sensing control circuit 114.

The image sensor 112 converts light imaged through the optical lens 111 into a charge to generate an image sensing signal. The processing circuit 113 acquires and digitizes the image sensing signal converted by the image sensor 112, to generate a sensed image.

The image sensing control circuit 114 controls the exposure state at which an object is exposed to the image sensor 112 through the optical lens 111, and controls the image sensor 112 to sense an image based on the output period of the output circuit 130. If the accumulation time is longer than the output period of the output circuit 130, the image sensing control circuit 114 also controls the processing circuit 113 to hold a sensed image in a frame memory of the processing circuit 113 during the period in which no image sensing signal can be output from the image sensor 112.

The pan head unit 140 functions as an image sensing system moving unit that moves the position of an image sensing system of the image sensing unit 110, and includes a pan head mechanism 141 and a pan head control circuit 142. The pan head mechanism 141 can support and rotate the image sensing unit 110 in the pan/tilt direction as the moving direction of the image sensing unit 110. The pan head control circuit 142 drives the pan head mechanism 141 through an actuator to change the image sensing position of the image sensing unit 110. The actuator serves as, for example, a stepping motor.

The mask superposing unit 120 includes a mask setting storage circuit 121, a superposition position calculation circuit 122, a mask drawing circuit 123, and a sampling circuit 124.

The sampling circuit 124 reads out the current accumulation time information (exposure time information) set in the image sensor 112 by the image sensing control circuit 114, and converts it into accumulated frame information per unit time, as a constant multiple of the output period of the output circuit 130. Note that the current accumulation time information means information indicating that the current frame is the fifth frame when, for example, thirty frames are to be acquired while the image sensing apparatus operates with a slow shutter function. If the output period of the output circuit 130 is, for example, sixty frames (/sec), the current accumulation time information may be converted into information indicating that the current frame is the 20th frame for one hundred twenty frames twice this output period, and held. In this case, while the output period is sixty frames (/sec), the shutter speed at which the image sensor 112 senses an image is 1/30 of this output period.

The sampling circuit 124 samples accumulation time information in a predetermined period until the image sensing control circuit 114 determines the accumulation time (for example, thirty frames), and the mask drawing circuit 123 superposes a mask.

The sampling circuit 124 also samples position information, including the current pan and tilt positions held in the pan head control circuit 142, in a predetermined period, until the pan head control circuit 142 reads out the position information, the image sensor 112 generates an image sensing signal, and the mask drawing circuit 123 superposes a mask.

Note that the sampling intervals of accumulation time information (accumulated frame information) and position information are desirably constant multiples of the output period of the output circuit 130, and more desirably at least twice this output period, and are periods equal to or shorter than the unit time of the accumulated frame information.

The mask setting storage circuit 121 stores mask setting information (mask position) as a region that requires privacy protection within the image sensing range of the image sensing unit 110, which can be changed by the pan head mechanism 141.

The superposition position calculation circuit 122 calculates a mask region in accordance with the accumulated frame information (accumulation time information) held in the sampling circuit 124. The superposition position calculation circuit 122 calculates a mask region after the accumulated frame information (accumulation time information) held in the sampling circuit 124 reaches, for example, the 30th frame. That is, the period in which the calculation operation is performed corresponds to a period thirty times the output period of the output circuit 130. Alternatively, if the accumulated frame information includes, for example, the accumulated frame remaining count, a mask region is calculated only when the accumulated frame remaining count monotonously decreases and reaches zero. When the current accumulation time information indicates the fifth frame, the accumulated frame remaining count is twenty-five. However, if the accumulated frame information includes the accumulated frame length and accumulated frame count, a mask region is calculated only when the accumulated frame length is equal to the accumulated frame count. When, for example, the accumulated frame length is thirty frames, and the current accumulated frame count is five, a mask region is calculated after the accumulated frame count monotonously increases and reaches thirty.

More specifically, the superposition position calculation circuit 122 compares the mask setting information stored in the mask setting storage circuit 121 with an image sensing region obtained from, for example, the oldest angle of view information, enlargement information, and position information held in the sampling circuit 124, to determine a mask region on an image sensing screen. The image sensing region is obtained from, for example, the oldest angle of view information, enlargement information, and position information of those corresponding to a predetermined period. The predetermined period is the period until the image sensor 112 generates an image sensing signal, and the mask drawing circuit 123 superposes a mask. With this determination operation, a mask region is set at a position specified by the mask setting information in the oldest image sensing region.

Also, when, for example, thirty frames are acquired while the image sensing apparatus operates with a slow shutter function, a mask region may be set at a position specified by mask setting information in an image sensing region corresponding to the 15th frame. Moreover, a mask region may be set in accordance with the oldest image sensing region, and the speed at which the image sensing region moves, so as to be elongated in the direction in which the image sensing region moves.

The mask drawing circuit 123 draws a privacy mask in a mask region, calculated by the superposition position calculation circuit 122, in a sensed image generated by the processing circuit 113. The privacy mask may be a solid mask or a mosaic mask. Since a mask superposition image obtained by drawing a privacy mask by the mask drawing circuit 123 is output from the output circuit 130, privacy can be protected from monitoring.

With this arrangement, even if the image sensing control circuit 114 controls the image sensor 112 for an accumulation time longer than the output period of the output circuit 130, it is possible to prevent a mask region from being calculated without updating the output image, and a mask from falling outside of a privacy region.

Figure 2:
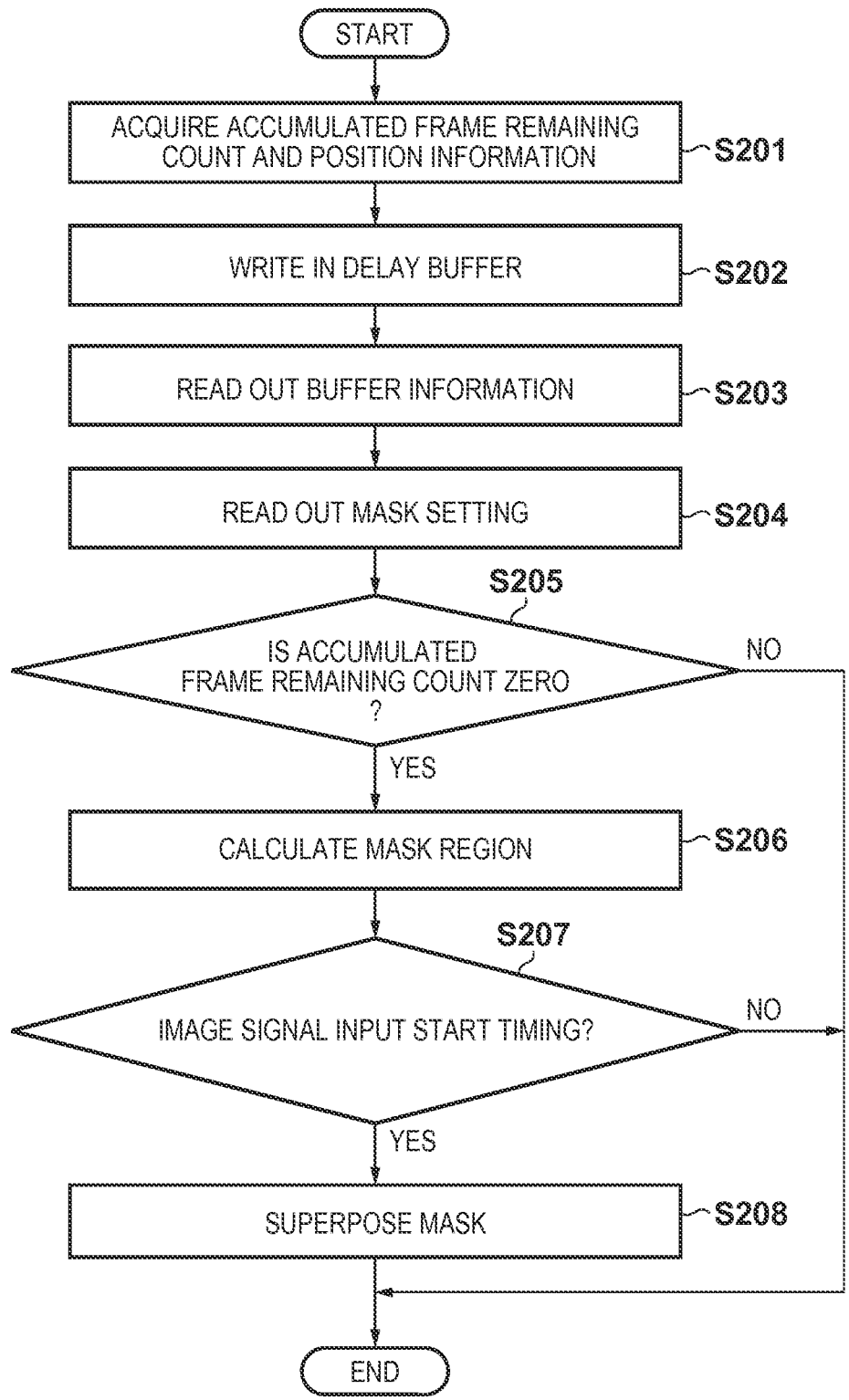
FIG. 2 is a flowchart showing the procedure of privacy mask superposition processing executed by the image sensing apparatus according to the embodiment.

The procedure of superposing a privacy mask by the mask superposing unit 120 will be described next, with reference to a flowchart shown in FIG. 2.

In step S201, the sampling circuit 124 acquires accumulation time information (accumulated frame information) from the image sensing control circuit 114, and image sensing position information, including position information, including the current pan and tilt positions, angle of view information, and enlargement information, from the pan head control circuit 142. Note that the accumulation time information (accumulated frame information) is the accumulated frame remaining count. The sampling intervals of accumulation time information (accumulated frame information) and position information are desirably constant multiples of the output period of the output circuit 130, and, more desirably, at least twice this output period, and are periods equal to or shorter than the unit time of the accumulated frame information.

In step S202, the sampling circuit 124 writes the acquired accumulation time information (accumulated frame information) and image sensing position information in a buffer inside of the sampling circuit 124.

In step S203, the superposition position calculation circuit 122 reads out the acquired accumulation time information (accumulated frame information) and image sensing position information from the buffer in the sampling circuit 124.

In step S204, the superposition position calculation circuit 122 reads out the mask setting information stored in the mask setting storage circuit 121.

In step S205, the superposition position calculation circuit 122 determines whether the accumulated frame remaining count acquired in step S201 is zero. If it is determined that the accumulated frame remaining count is zero (YES in step S205), the process advances to step S206. On the other hand, if it is determined that the accumulated frame remaining count is not zero (NO in step S205), the process ends.

In step S206, the superposition position calculation circuit 122 compares the mask setting information read out from the mask setting storage circuit 121 with an image sensing region obtained from, for example, the oldest angle of view information, enlargement information, and position information read out from the buffer, to calculate a mask region on an image sensing screen.

In step S207, the mask drawing circuit 123 determines whether the input start timing of the sensed image generated by the processing circuit 113 has come. If it is determined that the input start timing has come (YES in step S207), the process advances to step S208. On the other hand, if it is determined that the input start timing has not come (NO in step S207), the process ends.

In step S208, the mask drawing circuit 123 draws a privacy mask in the mask region, calculated by the superposition position calculation circuit 122, in the sensed image generated by the processing circuit 113. This mask region is determined by comparing the mask setting information stored in the mask setting storage circuit 121 with an image sensing region obtained from, for example, the oldest position information held in the sampling circuit 124.

As described above, according to this embodiment, it is possible to reduce the amount of shift of a privacy mask, despite the time difference between image sensing processing and mask superposition processing.

Figure 3:
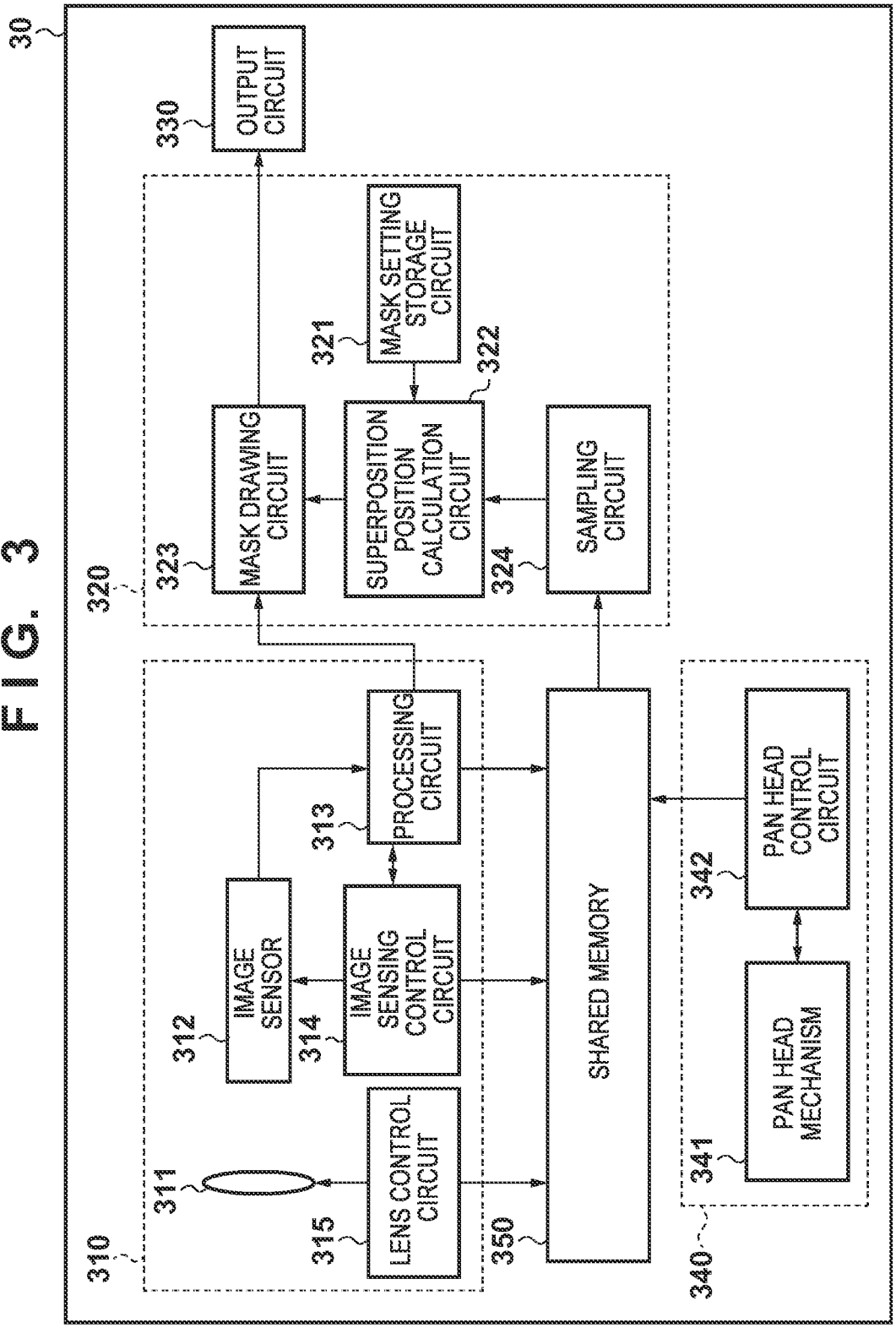
FIG. 3 is a block diagram illustrating an example of the configuration of another image sensing apparatus according to the embodiment.

An example of an image sensing apparatus in a parallel processing system, via a shared memory, will be described in the second embodiment. An example of the configuration of an image sensing apparatus 30 according to the second embodiment will be described first with reference to FIG. 3. The image sensing apparatus 30 includes an image sensing unit 310, a mask superposing unit 320, an output circuit 330, a pan head unit 340, and a shared memory 350. An image sensed by the image sensing unit 310 is output outside from the output circuit 330 via the mask superposing unit 320.

The image sensing unit 310 includes an optical lens 311, an image sensor 312, a processing circuit 313, an image sensing control circuit 314, and a lens control circuit 315. The processing circuit 313, the image sensing control circuit 314, and the lens control circuit 315 are connected to the shared memory 350.

The image sensor 312 converts light imaged through the optical lens 311 into a charge to generate an image sensing signal. The processing circuit 313 acquires and digitizes the image sensing signal sensed by the image sensor 312 to generate a luminance signal. The digital image signal is held in a frame memory inside of the processing circuit 313. Also, the processing circuit 313 can perform image enlargement processing for the sensed image, and writes the then enlargement ratio (enlargement information) in the shared memory 350.

The image sensing control circuit 314 calculates the time to accumulate charges in the image sensor 312, so that the level of the luminance signal generated by the processing circuit 313 becomes constant to control the image sensor 312. The image sensing control circuit 314 converts the then accumulation time into a frame count per unit time, and writes it in the shared memory 350 as the current accumulated frame information. At this time, the unit time is a constant multiple of the output period of the output circuit 330. If the accumulation time is longer than the output period of the output circuit 330, the image sensing control circuit 314 controls the processing circuit 313 to hold a sensed image in a frame memory of the processing circuit 313 during the period in which no image sensing signal can be output from the image sensor 312.

If the optical lens 311 is a zoom lens, the lens control circuit 315 can change the zoom magnification by controlling the optical lens 311, and calculates the current angle of view from the zoom position of the optical lens 311, and writes the angle of view information in the shared memory 350.

The mask superposing unit 320 includes a mask setting storage circuit 321, a superposition position calculation circuit 322, a mask drawing circuit 323, and a sampling circuit 324. The sampling circuit 324 is connected to the shared memory 350.

Note that FIG. 5 illustrates an example of the configuration of the sampling information of the sampling circuit 324. The sampling information indicates that sampling times $z^0$, $z^{-1}$, $z^{-2}$, $z^{-3}$, $z^{-4}$, and $z^{-5}$, and pieces of information older in descending order of the numerical superscript are stored. Time $z^0$ is the most recent time. Information at each of times $z^0$ to $z^{-3}$ is held for, for example, the angle of view.

The sampling circuit 324 reads out angle of view information from the shared memory 350, and samples angle of view information corresponding to a predetermined period (a period corresponding to sampling times $z^0$, $z^{-1}$, $z^{-2}$, and $z^{-3}$) until the image sensor 312 generates an image sensing signal, and the mask drawing circuit 323 superposes a mask.

The sampling circuit 324 also reads out enlargement information (enlargement ratio) from the shared memory 350, and samples enlargement information (enlargement ratio) corresponding to a predetermined period (a period corresponding to sampling time $z^0$) until the processing circuit 313 performs enlargement processing, and the mask drawing circuit 323 superposes a mask.

The sampling circuit 324 moreover reads out accumulated frame information (the accumulated frame remaining count in an example shown in FIG. 5) from the shared memory 350, and samples accumulated frame information (for example, the accumulated frame remaining count) corresponding to a predetermined period (a period corresponding to sampling times $z^0$, $z^{-1}$, $z^{-2}$, $z^{-3}$, $z^{-4}$, and $z^{-5}$) until the image sensing control circuit 314 determines the accumulation time, and the mask drawing circuit 323 superposes a mask.

The sampling circuit 324 again reads out position information (the pan, tilt, and rotation positions in an example shown in FIG. 5) from the shared memory 350, and samples position information (a period corresponding to sampling times $z^0$, $z^{-1}$, $z^{-2}$, and $z^{-3}$) until the image sensor 312 generates an image sensing signal, and the mask drawing circuit 323 superposes a mask.

The readout interval at which the sampling circuit 324 reads out information from the shared memory 350 is desirably a constant multiple of the output period of the output circuit 330, and, more desirably, at least twice this output period, and is a period equal to or shorter than the writing of the accumulated frame information.

The mask setting storage circuit 321 stores mask setting information (mask position) indicating a region that requires privacy protection in the image sensing range that can be changed by the pan head mechanism 341.

The superposition position calculation circuit 322 calculates a mask region in accordance with accumulated frame information (accumulation time information) held in the sampling circuit 324. The superposition position calculation circuit 322 calculates a mask region, like the superposition position calculation circuit 122 shown in FIG. 1.

More specifically, the superposition position calculation circuit 322 compares the mask setting information stored in the mask setting storage circuit 321 with an image sensing region obtained from, for example, the oldest angle of view information, enlargement information, and position information held in the sampling circuit 324, to determine a mask region on an image sensing screen. The oldest angle of view information, enlargement information, and position information held in the sampling circuit 324 are the angle of view information at sampling time $z^{-3}$, the enlargement information at sampling time $z^{-0}$, and the position information at sampling time $z^{-3}$, respectively.

The mask drawing circuit 323 draws a privacy mask in a mask region, calculated by the superposition position calculation circuit 322, in a sensed image generated by the processing circuit 313. Since a mask superposition image obtained by drawing a privacy mask by the mask drawing circuit 323 is output from the output circuit 330, privacy can be protected from monitoring.

The pan head unit 340 includes a pan head mechanism 341 and a pan head control circuit 342. The pan head control circuit 342 is connected to the shared memory 350. The pan head mechanism 341 can support and rotate the image sensing unit 310 in the pan, tilt, and rotation directions. The pan head control circuit 342 drives the pan head mechanism 341 through a stepping motor as an actuator to change the image sensing position of the image sensing unit 310. The pan head mechanism 341 is equipped with a rotary encoder, while the pan head control circuit 342 has a current position measurement function of always measuring the position to which the pan head mechanism 341 has moved, and writes the current image sensing position information of the image sensing unit 310 in the shared memory 350 every time the measurement position changes. Since the pan head mechanism 341 is equipped with a rotary encoder, a DC motor, for example, can be used as an actuator. Because the pan head control circuit 342 generates position information from the encoder, a privacy mask can be superposed on an appropriate position, even if the pan head mechanism 341 moves in response to an external force generated owing, for example, to mischief.

Figure 4:
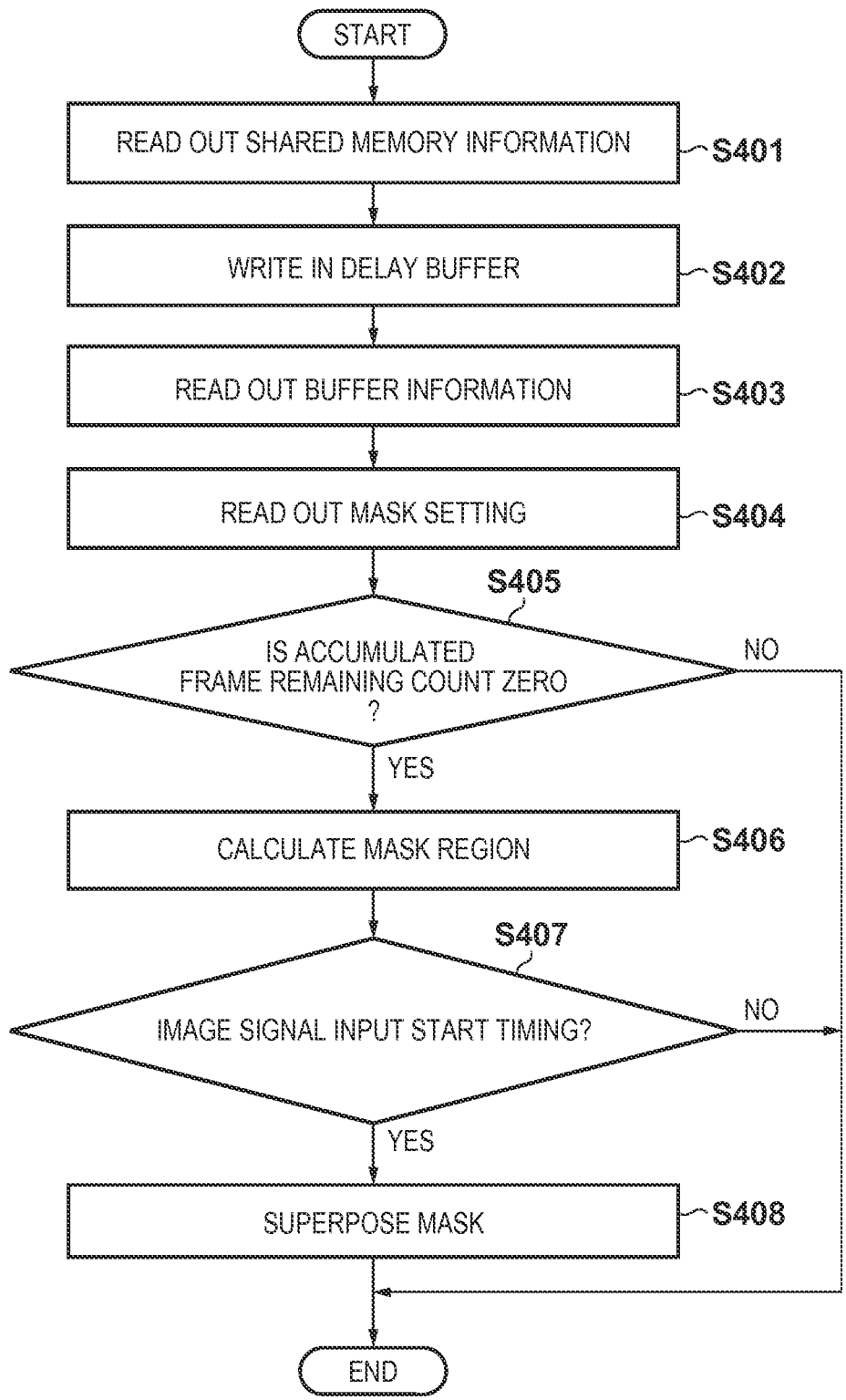
FIG. 4 is a flowchart showing the procedure of privacy mask superposition processing executed by another image sensing apparatus according to the embodiment.

The procedure of superposing a privacy mask by the mask superposing unit 320 will be described next, with reference to a flowchart shown in FIG. 4.

In step S401, the sampling circuit 324 acquires, from the shared memory 350, the current accumulation time information (accumulated frame information), and image sensing position information, including position information, including the current pan and tilt positions, angle of view information, and enlargement information. Note that the accumulation time information (accumulated frame information) is the accumulated frame remaining count. The readout interval at which the sampling circuit 324 reads out information from the shared memory 350 is desirably a constant multiple of the output period of the output circuit 330, and, more desirably, at least twice this output period, and is a period equal to or shorter than the writing of the accumulated frame information.

In step S402, the sampling circuit 324 writes the acquired accumulation time information (accumulated frame information) and image sensing position information in a buffer inside the sampling circuit 324.

In step S403, the superposition position calculation circuit 322 reads out, from the buffer in the sampling circuit 324, the accumulation time information (accumulated frame information) and image sensing position information acquired in the past.

In step S404, the superposition position calculation circuit 322 reads out the mask setting information stored in the mask setting storage circuit 321. Mask region calculation by the superposition position calculation circuit 322 in steps S404 to S408, and drawing of a privacy mask by the mask drawing circuit 323 are as described above, and are the same as in steps S204 to S208 in FIG. 2, so a description thereof will not be given.

As described above, according to this embodiment, it is possible to reduce the amount of shift of a privacy mask despite the time difference between image sensing processing and mask superposition processing.

The present invention is effective in privacy protection during the pan head operation of a monitoring camera equipped with a pan head with a large time difference between image sensing processing and privacy mask superposition processing and, especially, a monitoring camera implemented by a parallel processing system.

Other Embodiments

Embodiments of the present invention can also be realized by a computer of a system or an apparatus that reads out and executes computer executable instructions recorded on a storage medium (for example, a non-transitory computer-readable storage medium) to perform the functions of one or more of the above-described embodiments of the present invention, and by a method performed by the computer of the system or an apparatus by, for example, reading out and executing the computer executable instructions from the storage medium to perform the functions of one or more of the above-described embodiments. The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A processing control apparatus that controls mask processing for images sensed by an image sensing unit with variable image sensing positions, and outputs at a first interval the images to which the mask processing is performed, the apparatus comprising:
    a storage unit configured to store a mask setting;
    a control unit configured to control the image sensing unit and to produce exposure time information that represents a progression of exposure by the image sensing unit;

an obtaining unit configured to obtain image sensing positions of the image sensing unit at a second interval that is shorter than the first interval; and a determination unit configured to determine whether or not the exposure by the image sensing unit has finished based on the exposure information, to determine a position on an image to which the mask processing is performed based on (i) the oldest image sensing position of the image sensing unit among the image sensing positions obtained by the obtaining unit in a predetermined period and (ii) the mask setting, and to control the mask processing to the determined position on the image on condition that the exposure by the image sensing unit has finished.

2. The apparatus according to claim 1, wherein the exposure information monotonously increases or monotonously decreases at a second predetermined period, and the determination unit determines that the exposure has finished when the exposure information reaches a predetermined value.

3. The apparatus according to claim 1, wherein the image sensing position of the image sensing unit includes a rotation position of a rotatable image sensing unit.

4. The apparatus according to claim 1, wherein the image sensing unit has a variable zoom magnification, and the determination unit determines the position on the image to which the mask processing is performed, based on the oldest image sensing position of the image sensing unit corresponding to the zoom magnification of the image sensing unit, and the mask setting.

5. The apparatus according to claim 1, further comprising an enlarging unit configured to enlarge the image sensed by the image sensing unit.

6. The apparatus according to claim 1, further comprising a memory in which the exposure information and the image sensing position are stored, wherein the determination unit determines whether or not the exposure has finished based on the exposure information stored in the memory, and determines the position on the image to which the mask processing is performed, based on the oldest image sensing position stored in the memory.

7. A processing control method of controlling mask processing for images sensed by an image sensing unit with variable image sensing positions, and outputs at a first interval the images to which the mask processing is performed, the method comprising the steps of:

obtaining exposure information reproduced by a control unit that controls the image sensing unit, the exposure information representing a progression of exposure by the image sensing unit;

obtaining image sensing positions of the image sensing unit at a second interval that is shorter than the first interval;

reading out a mask setting from a storage unit;

determining whether or not the exposure by the image sensing unit has finished based on exposure information;

determining a position on an image to which the mask processing is performed, based on (i) the oldest image sensing position of the image sensing unit among the image sensing positions obtained in a predetermined period and (ii) the mask setting; and controlling the mask processing to the determined position on the image on condition that the exposure by the image sensing unit has finished.

8. The method according to claim 7, wherein the exposure information monotonously increases or monotonously decreases at a second predetermined period, and wherein, in the step of determining that the exposure has finished when the exposure information reaches the predetermined value.

9. The method according to claim 7, wherein the image sensing unit has a variable zoom magnification, and wherein, in the step of determining a position on the image, the position on the image to which the mask processing is performed, is determined, based on the oldest image sensing position of the image sensing unit corresponding to the zoom magnification of the image sensing unit, and the mask setting.

10. The method according to claim 7, further comprising a step of enlarging the image sensed by the image sensing unit.

11. A non-transitory computer-readable storage medium storing a computer program for controlling mask processing for images sensed by an image sensing unit with variable image sensing positions, and outputs at a first interval the images to which the mask processing is performed, the computer program executing the steps of:

obtaining exposure information reproduced by a control unit that controls the image sensing unit, the exposure information representing a progression of exposure by the image sensing unit;

obtaining image sensing positions of the image sensing unit at a second interval that is shorter than the first interval;

reading out a mask setting from a storage unit;

determining whether or not the exposure by the image sensing unit has finished based on the obtained exposure information;

determining a position on an image to which the mask processing is performed, based on (i) the oldest image sensing position of the image sensing unit among the image sensing positions obtained in a predetermined period and (ii) the mask setting; and controlling the mask processing to the determined position on the image on condition that the exposure by the image sensing unit has finished.

12. The storage medium storing the computer program according to claim 11, wherein the exposure information monotonously increases or monotonously decreases at a predetermined period, and wherein whether the exposure has finished is determined, based on whether the exposure information reaches the predetermined value.

* * * * *